Dec. 13, 1949          D. DE WITT          2,490,859
MOUNT FOR ELECTRICAL UNITS
Filed March 7, 1946          2 Sheets—Sheet 1
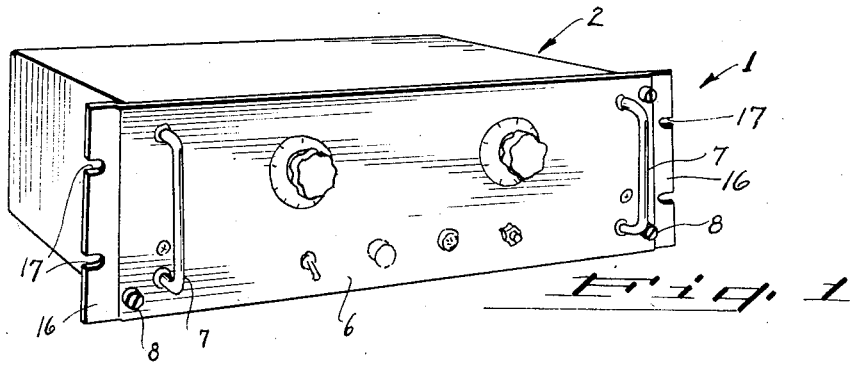
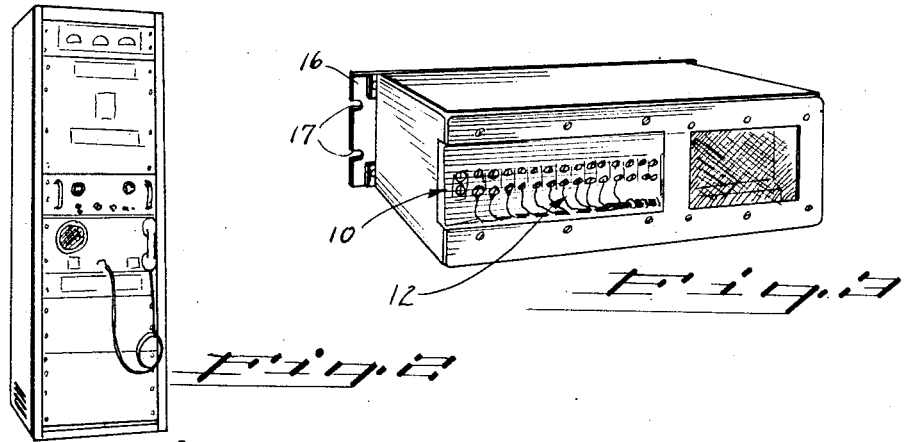
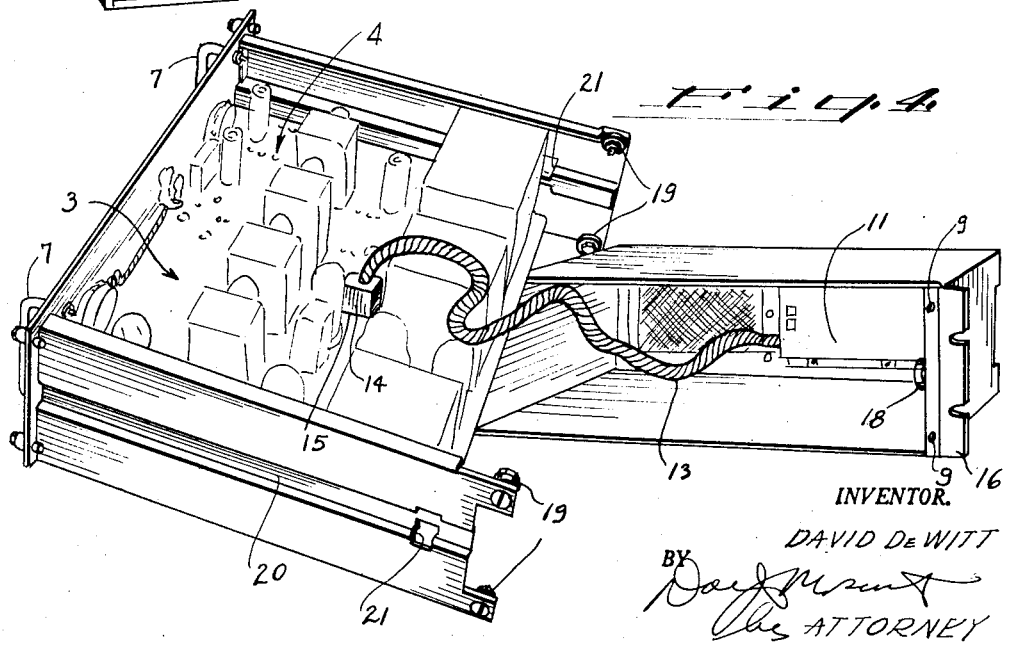
INVENTOR.
DAVID De WITT
BY
ATTORNEY

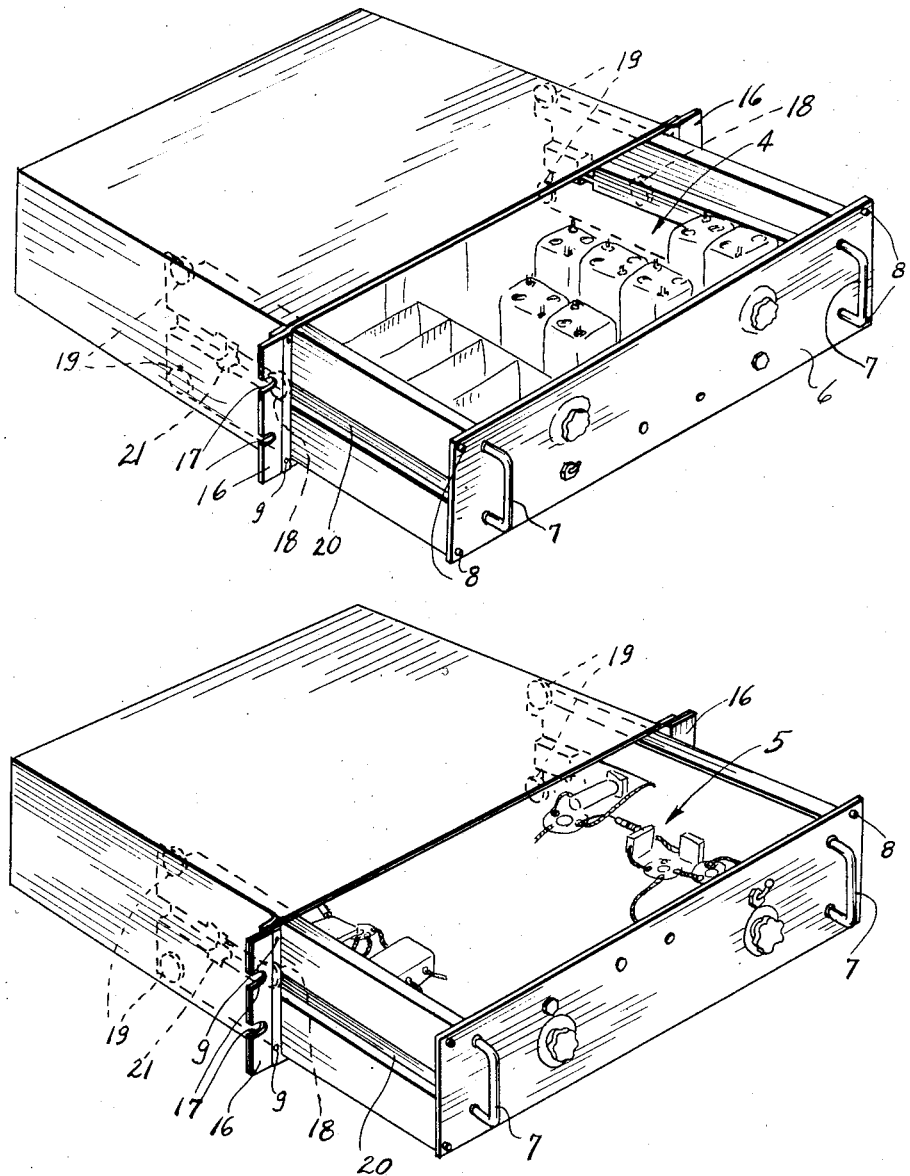

Patented Dec. 13, 1949

2,490,859

UNITED STATES PATENT OFFICE 2,490,859

MOUNT FOR ELECTRICAL UNITS

David De Witt, Little Neck, N. Y., assignor to Radio Receptor Company, Inc., New York, N. Y., a corporation of New York Application March 7, 1946, Serial No. 652,526

3 Claims. (Cl. 174—59)

This invention relates to mounts for electrical units, particularly radio units, such as radio receivers, and the like.

Conventional units of this class comprise a casing which encloses and protects all the functioning elements and wire connections of the unit, leaving only control knobs, dials, and switches, assembled in a control panel, normally accessible from the outside. Thus, in order to service the unit, it is necessary to remove it from its casing, and this necessitates disconnecting the unit from all outer electrical circuits, such as a power line, thus interrupting the operation of the unit. Then, the removed unit has to be carried to a work bench where it can be held in a position suitable for the repairman's work. The above inconvenient features of conventional mounts are especially evident in the case of units designed to be assembled in multiple with a number of associated units, usually all connected to one main line.

Accordingly my invention is particularly directed, although by no means limited to, mounts designed to be assembled in a rack, and the drawings of my preferred embodiment illustrate one such mount.

The main object of my invention is to provide a mount for an electrical unit, which makes it possible to withdraw the unit from its casing without interrupting its operation, to make it completely accessible for inspection and repairs.

Another object is to provide a mount by means of which the various operating elements of the unit may be rendered accessible as desired, and maintained in a stable position for inspection and repairs, without interfering with the operation of the unit.

A further object is to provide a mount designed to be assembled in multiple with a number of associated mounts, which achieves the above objects with a maximum of compactness, simplicity, and sturdiness.

Other related and ancillary objects will become apparent as the description proceeds.

In the drawings:

Fig. 1 is a front perspective view of a unit, in this example a radio receiver, mounted according to my invention, enclosed in its case.

Fig. 2 is a front perspective view of a battery of similar units assembled together in a rack.

Fig. 3 is a rear perspective view of the unit in its case.

Fig. 4 is a perspective view of the unit withdrawn from its case, but still electrically connected.

Fig. 5 is a perspective view of the unit being withdrawn from, or reinserted into, the case.

Fig. 6 is a perspective view like that of Fig. 5, but with the chassis in an upside down position, that is with the wiring on top, and the tubes, coils, etc. on the bottom.

Referring now in detail to the drawings, the complete encased unit, indicated generally at 1, consists of a case 2 and a chassis 3. The chassis preferably carries such elements of the unit as tubes, coils, and the like, on the top side, where they are indicated generally at 4, and the circuit wiring connections together with other small elements on the bottom side, where they are indicated generally at 5. All the elements 4 and 5 together will be designated hereafter for the sake of convenience as the "circuit elements." The controls of the unit are mounted on the front 6 of the chassis, which has also two handles 7 for pulling the chassis out of the case, and four captive screws 8 which fasten into the case at 9 to hold the chassis immovably therein. The rear of the case carries a terminal strip, indicated generally at 10, which comprises a series of terminals for connection to the outside line and to the various elements of the circuit of the receiver, the proper wiring diagram between line and circuit terminals being provided within the box 11.

A number of wires leading from the circuit terminals, which wires are indicated generally at 12, come together to form a cord 13, ending in a multiple plug 14 for which a socket 15 is provided on the chassis. As particularly shown in Fig. 4, the cord 13 is of sufficient length for plug and socket to be coupled when the chassis is out of the case, and even when the chassis is turned, slanted, or inverted in such a way as to make every circuit element mounted thereon accessible.

The case 2 has two flanges 16, and in each flange there are cut two slots 17 which allow of the assembling of a number of units in a single rack in a quite obvious manner. In addition the case has mounted in its interior, near the front opening, two freely rotatable guide rollers 18, serving a double purpose which will be explained hereafter.

The chassis 3 carries on the rear ends of its sides four rear rollers 19, also freely rotatable, which protrude slightly above the top and below the bottom of the sides of the chassis. It is to be noted here that as far as relates to the mechanical elements of the chassis, top and bottom are interchangeable terms, as will appear later, whereas as far as relates to the circuit elements mounted on the chassis, top will be taken to mean the side supporting the elements 4, and bottom the side supporting the elements 5.

Formed in the sides of the chassis are two guideways 20, adapted to receive said guide rollers 18, each guideway having a twin cutout 21 in its top and bottom, so positioned as to be engaged by its corresponding guide roller 18 when, and only when, the chassis has been so far withdrawn from the case to expose all of the circuit elements it carries. Now obviously when the chassis is being moved in or out of the case, its rear end is firmly guided by the rear rollers 19 which snugly engage the top and bottom of the inside of the case, but the front end would sag if it were not for the guide rollers 18, which hold it up through their engagement with the guideways 20. However, as soon as the chassis is far enough out for the guide rollers to reach the twin cutouts 21, they partially protrude through said cutouts, the front end of the chassis is allowed to drop, and the chassis is held in its open position, the cutouts acting as detents.

It is seen that the motion of the chassis in and out of the case, and the holding of the chassis in its open position, depend only on the combined action of the guide rollers 18, the rear rollers 19, the guideways 20, and the cutouts 21, and inasmuch as all those groups of elements are arranged symmetrically with respect to a horizontal plane lying halfway between top and bottom of case, the chassis may be turned upside down without any collective effect on said groups of elements, and the motion of the chassis, and the locking of it in its open position, will take place exactly in the same manner as before. Therefore, not only is it possible to withdraw the chassis from its case, as shown in Fig. 4, for inspection and repairs without detaching the plug 14 from its socket, that is without interrupting the operation of the unit, but it is likewise possible to hold the chassis in a stable, solid open position, with all the circuit elements 4, or all the circuit elements 5, showing on top, and to work on it with safety and ease, without electrically disconnecting the unit, and interrupting its operation.

It is to be understood that the foregoing description has been given merely by way of example, and that many changes and modifications may be made, both in the mount itself, and in the type of unit to which it is applied, without departing from the spirit of the invention or exceeding the scope of the claims.

I claim:

1. In an electrical unit, the combination of a chassis having two substantially horizontal faces, each of said faces having mounted thereon a number of the circuit elements of the unit, a casing for said chassis, means for rollingly engaging the top and bottom inner surfaces of said casing for guiding the movement of said chassis in and out of said casing with either of the aforementioned faces in a topmost position, means comprising at least one guideway on one of the chassis and casing, at least one projection on the other of the chassis and casing for engaging said guideway, and a slot in said guideway into which the projection is received for lockingly holding said chassis with either face thereof uppermost in a position with respect to said casing wherein all circuit elements are accessible from the outside, and means for the electrical connection of the unit to outside electrical circuits, said last mentioned means comprising a flexible member to maintain said electrical contact when said chassis is completely withdrawn from said casing.

2. In an electrical unit, in combination, a chassis having a front and two inner faces, said front carrying the controls of the unit, and of said two inner faces one, normally uppermost, carrying a number of circuit elements of the unit, and the other, normally lowermost, carrying the remaining circuit elements and the circuit wiring of the unit; a casing for said chassis; means for rollingly engaging the top and bottom inner surfaces of said casing for guiding the movement of said chassis in and out of said casing both with said two inner faces in their normal and in an inverted positioned relationship; means comprising a longitudinal guideway along the sidewalls of the chassis, projections on said casing disposed in said guideways and a stop in each said guideway contacted by said projection upon movement of said chassis relative to the casing for lockingly holding said chassis in a protruding position with respect to said casing both with said two inner faces in their normal and in an inverted positioned relationship, to render any desired element of the unit accessible for servicing; and means for electrically connecting the unit to outside electrical circuits, said means comprising a flexible member whereby the unit may be serviced without discontinuing the operation thereof.

3. In an electrical unit, a casing; a chassis supporting the circuit elements of the unit, said chassis being movable in and out of said casing; means for guiding the motion of said chassis with respect to said casing, comprising rear rollers freely mounted on said chassis rollingly to engage the top and bottom inner surfaces of said casing, guideways formed in the sides of said chassis, and guide rollers freely mounted on the inner sides of said casing and engaging said guideways to support the front end of said chassis; openings cut in said guideways, said openings receiving said guide rollers when the chassis is in a protruding position wherein all circuit elements of the unit are accessible from the outside, to allow the front end of the chassis to sag, and lockingly to hold said chassis in said protruding position; all of the aforementioned rear rollers, guide rollers, guideways, and openings being arranged symmetrically with respect to a horizontal plane lying midway between top and bottom of said casing, thereby cooperating with one another in the aforesaid way both with said chassis in its normal and in an overturned position with respect to said casing; and means for the electrical connection of the unit to outside electrical circuits, said last mentioned means comprising a flexible member dimensioned to maintain said electrical connection when said chassis is completely withdrawn from said casing, thereby allowing the unit to be serviced while in operation.

DAVID DE WITT.

REFERENCES CITED

The following references are of record in the file of this patent:

UNITED STATES PATENTS

| Number | Name | Date |
|---|---|---|
| 1,178,374 | Oberst | June 25, 1929 |
| 1,824,517 | Van Dyck | Sept. 22, 1931 |
| 1,974,613 | Hunter | Sept. 25, 1934 |
| 2,077,160 | Wilson | Apr. 13, 1937 |
| 2,185,562 | Nielsen | Jan. 2, 1940 |
| 2,245,338 | Hammond | June 10, 1941 |

FOREIGN PATENTS

| Number | Country | Date |
|---|---|---|
| 559,734 | Great Britain | Mar. 2, 1944 |